(12) United States Patent
Hildesson et al.

(10) Patent No.: US 6,372,177 B1
(45) Date of Patent: Apr. 16, 2002

(54) METHOD AND DEVICE FOR MANUFACTURING A HOLLOW PLASTIC COMPONENT

(75) Inventors: Mikael Hildesson, Romelanda; Tor Hesselgren, Mölndal; Lars Odelmark, Färgelanda, all of (SE)

(73) Assignees: Volvo Lastvagnar AB, Gothenburg; Lear Corporation Sweden AB, Trollhattan, both of (SE)

( * ) Notice: Subject to any disclaimer, the term of this patent is extended or adjusted under 35 U.S.C. 154(b) by 0 days.

(21) Appl. No.: 09/319,418

(22) PCT Filed: Dec. 4, 1997

(86) PCT No.: PCT/SE97/02028

§ 371 Date: Aug. 3, 1999

§ 102(e) Date: Aug. 3, 1999

(87) PCT Pub. No.: WO98/28119

PCT Pub. Date: Jul. 2, 1998

(30) Foreign Application Priority Data

Dec. 4, 1996 (SE) .............................................. 9604475

(51) Int. Cl.[7] .............................................. B29D 22/00
(52) U.S. Cl. .................... 264/572; 264/328.7; 264/500; 425/130
(58) Field of Search ................................. 264/572, 500, 264/328.7; 425/130

(56) References Cited

U.S. PATENT DOCUMENTS

| | | | | | |
|---|---|---|---|---|---|
| 5,076,778 | A | * | 12/1991 | Strunk et al. | 425/387.1 |
| 5,090,886 | A | * | 2/1992 | Jaroschek | 425/130 |
| 5,204,050 | A | | 4/1993 | Loren | 264/504 |
| 5,204,051 | A | | 4/1993 | Jaroschek | 264/572 |
| 5,728,410 | A | * | 3/1998 | Hendry | 425/130 |
| 5,759,459 | A | * | 6/1998 | Eckardt et al. | 264/40.1 |
| 5,762,861 | A | * | 6/1998 | Gosdin | 264/572 |
| 5,798,080 | A | * | 8/1998 | Ogura et al. | 264/572 |
| 5,928,677 | A | * | 7/1999 | Gosdin | 425/130 |
| 6,146,579 | A | * | 11/2000 | Matsumoto et al. | 264/513 |

* cited by examiner

*Primary Examiner*—Nam Nguyen
*Assistant Examiner*—Emmanuel Luk
(74) *Attorney, Agent, or Firm*—Young & Thompson

(57) ABSTRACT

A gas injection moulding device with a mould cavity which communicates via a valve with spill chambers. The injection moulding process is controlled by a control unit so that the valve is first kept partially open during the injection of fluent plastic material for purging the mould cavity of air and for spilling a first small amount of plastic material to the spill chambers, whereas during the subsequent injection of gas, the valve is completely opened.

6 Claims, 3 Drawing Sheets

METHOD AND DEVICE FOR MANUFACTURING A HOLLOW PLASTIC COMPONENT

BACKGROUND OF THE INVENTION

The present invention relates to a method of manufacturing a plastic article with a cavity enclosed in the same, comprising the following steps: injection of plastic material under pressure into a mould cavity, cooling the plastic material closest to the walls of the mould cavity, injection of gas under pressure into fluent plastic material, which is surrounded by the cooled plastic material, pressing out, by means of the injected gas, fluent plastic material to at least one spill chamber located outside the mould cavity and communicating with the mould cavity injected gas, to form a cavity in the plastic material, and separation of the plastic material in the spill chamber from the plastic material in the mould cavity.

The invention also relates to an injection moulding device with a mould cavity defined by movable walls, comprising means for injecting under pressure fluent plastic material into the mould cavity, means for injecting gas under pressure into the plastic material in the mould cavity, at least one spill chamber located outside the mould cavity and communicating with the mould cavity, said spill chamber being arranged to receive plastic material forced out by the injected gas, and means for opening and cutting off the communication with the spill chamber.

DESCRIPTION OF THE RELATED ART

The method of manufacturing hollow plastic articles by first filling the mould cavity completely as in normal injection moulding and thereafter, with the aid of the gas, pressing the core material out to a spill changer, so that the cavity in the article is formed, is usually called "blow-out gas injection" and is described, for example, in U.S. Pat. No. 5,204,051. In the known method, the communication between the mould cavity and the spill chamber is kept closed during the injection of the plastic material and is opened after the mould cavity has been completely filled, and only after the surface of the plastic material has hardened somewhat. The purging here is done by leakage between the mould halves, and this means that the counterpressure against the plastic material will be relatively great.

In this process, all of the plastic material injected into the mould cavity will remain in the cavity. This means that the plastic material, which, at the beginning of the injection, is in and nearest to the nozzle of the mould injector and which has a lower temperature and/or poorer quality than the rest of the plastic material, especially when the flow channel areas are large, can end up in the mould cavity at a location farthest away from the inlet to the mould cavity. This can occur in particular when injecting thermosetting resins and/ or so-called cross-linkable plastics.

SUMMARY OF THE INVENTION

The purpose of the present invention is to achieve a method and a device, through which the above mentioned disadvantage can be eliminated, so that more even wall thickness and uniform plastic quality can be achieved in the manufactured plastic article.

This is achieved by virtue of the fact that a communication with a predetermined flowthrough area is maintained between the mould cavity and the spill chamber during the injection of the fluent plastic material, and that a communication with a larger predetermined flowthrough area is maintained between the mould cavity and the spill chamber during the injection of the gas.

The communication with smaller flowthrough area is maintained for such a long time that all the air is pressed out of the cavity and possibly a small amount of the plastic material is pressed out to the spill chamber. The method according to the invention achieves not only a product with an even wall thickness and uniform plastic quality but also makes it possible to shorten the production cycle by virtue of the fact that purging of the mould cavity of air can be done much more rapidly than when the purging is done by normal leakage between two mould halves. More rapid purging also reduces the risk of small air bubbles forming in the plastic material.

An injection moulding device for carrying out the method is characterized in that a communication with a predetermined flowthrough area is maintained between the mould cavity and the spill chamber during the injection of the fluent plastic material, and that a communication with a larger predetermined flowthrough area is maintained between the mould cavity and the spill chamber during the injection of the gas.

BRIEF DESCRIPTION OF THE DRAWINGS

The invention will be described in more detail below with reference to examples shown in the accompanying drawings, where.

DESCRIPTION OF THE PREFERRED EMBODIMENT

Figure 1:
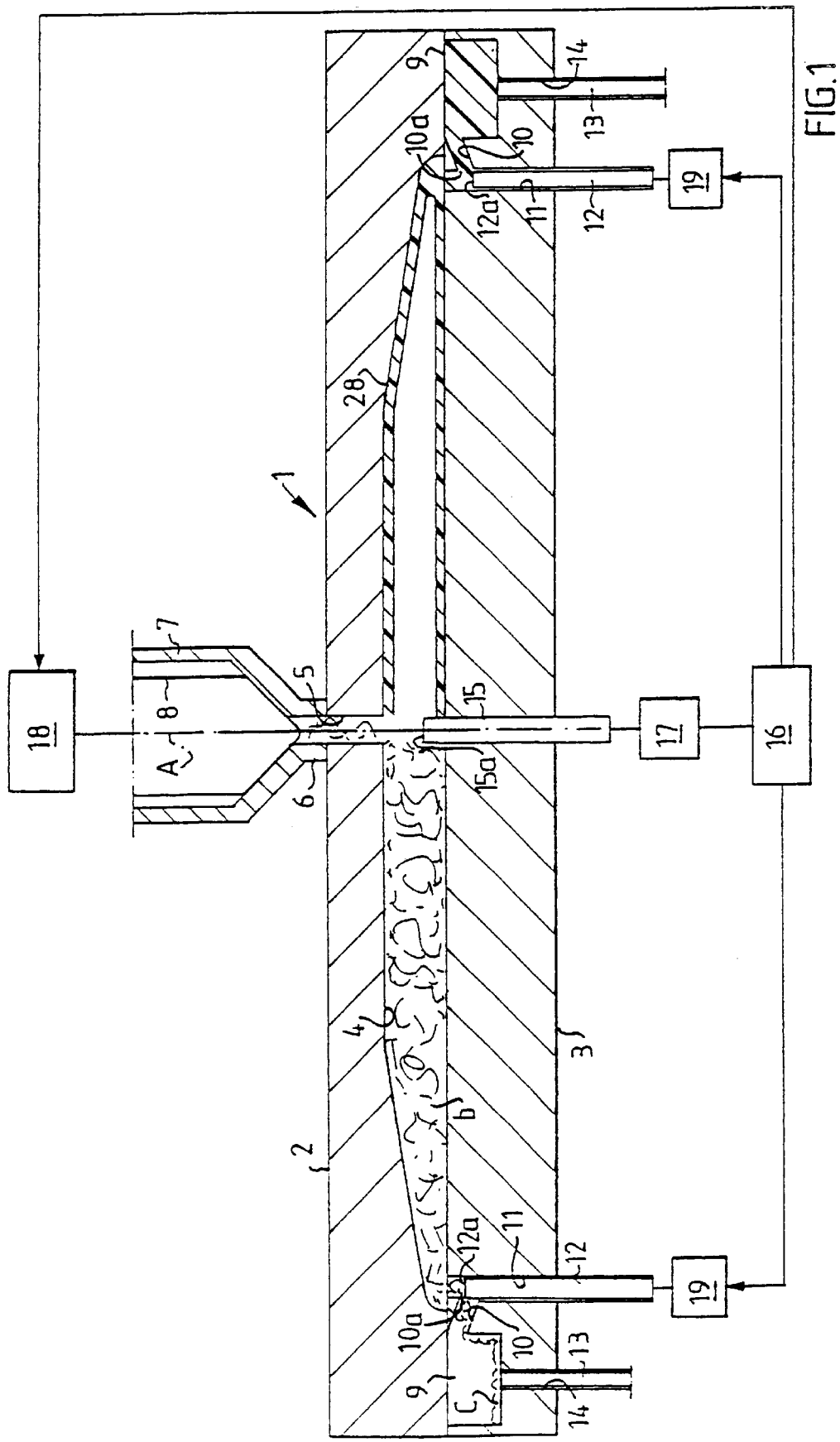
FIG. 1 shows a section through a schematically represented injection moulding device according to the invention.

Element 1 in FIG. 1 generally designates a mould, which comprises upper and lower mould halves 2 and 3, respectively, which define together a mould cavity 4 and which can be moved away from each other, by means not shown in more detail here, from the position shown to open the mould cavity 4. A nozzle 6 of a mould injector opens into a channel 5 through the upper mould half 2. The mould injector has a cylinder 7 and a piston 8 axially movable in the cylinder, by means of which fluent plastic in the cylinder 7 can be pressed into the mould cavity 4.

The mould halves 2 and 3 define, in addition to the mould cavity 4, a pair of so-called spill chambers 9, which communicate with the mould cavity 4 via individual channels 10. A bore 11 opens into each channel 10, and an ejector pin 12 is arranged displaceable in each bore 11. A corresponding ejector pin 13 is arranged in a bore 14, opening into each spill chamber 9. A gas needle 15 extends directly opposite the channel 5 and is provided with an opening 15a, through which gas can be injected into the plastic material in the mould cavity 4. The gas needle 15 can be fixed in the position shown or be extractable out of the mould cavity 4.

Element 16 in FIG. 1 designates a control unit, 17 designates a compressed gas source and 18 and 19 are drive means for driving the piston 8 and the ejector pins 12, respectively. FIG. 1 is symmetrical relative to a center plane A and to the left of the plane A the state is illustrated after the piston 8 has come to the bottom of the cylinder 7 and the mould cavity 4 has been completely filled with fluent plastic "b" while air and a small amount of plastic material "c" have been pressed out to the spill chamber 9. During the plastic injection phase, the control unit 6 keeps the ejector pins 12 in the position shown to the left in FIG. 1 via the drive means 19, in which position the upper end surface 12*a* of each ejector pin 12 leaves a narrow passage 10*a* open, through which first air and then plastic material can pass to the spill chamber 9.

When the injection of plastic is finished, all air, and possibly a small amount of plastic, has been evacuated to the spill chambers 9. The control unit 16 then activates the compressed gas source 17 so that gas under pressure (preferably nitrogen) is introduced via the gas needle 15 and out through its openings 15*a* into the plastic which is not yet hardened, which is then pressed out through the channels 10 and into the spill chambers 9 until they are completely filled, as is illustrated to the right in FIG. 1. During the gas injection phase, the control unit 16 keeps the ejector pins 12 in the position shown to the right in FIG. 1, in which position the end surface 12*a* is at a lower level to open the entire flowthrough cross-sectional area of the channel 10.

When the plastic material has hardened, the mould cavity 4 is opened and the control unit 16 activates the drive means 19 of the ejector pins 12 to push the pins 12 up to lift the plastic article from the lower mould half 3. As the pins 12 move through the channel 11, the communication between the plastic material in the mould cavity 4 is cut off from the plastic material in the spill chamber 9, so that the latter can then be ejected with the ejector pin 13.

Figure 2:
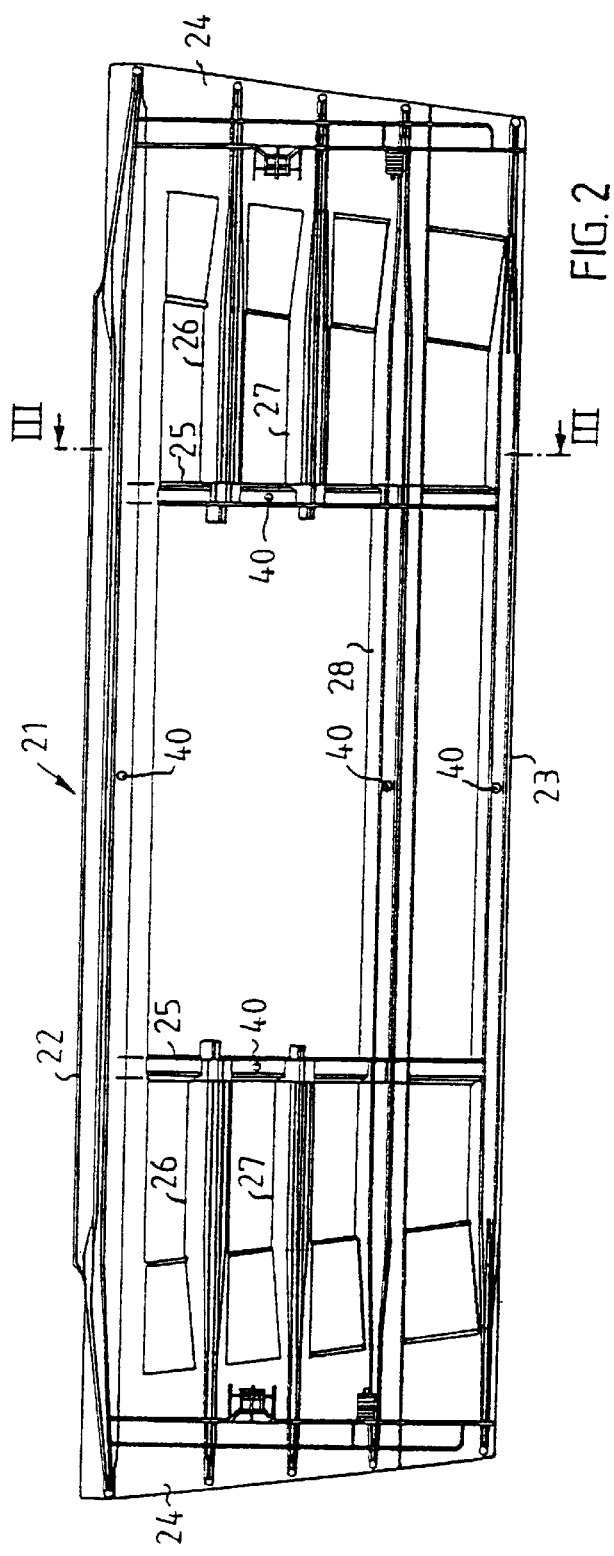
FIG. 2 shows a perspective view of the rear of a plastic panel in the form of a radiator grill for motor vehicles, which can be manufactured by using the method and the device according to the invention.
Figure 4:
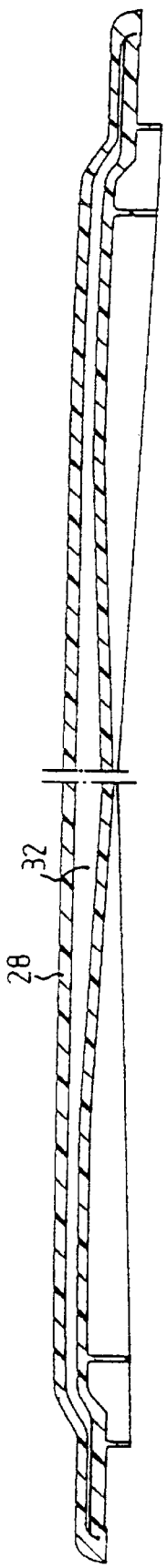
FIG. 4 shows a section along the line IV—IV in FIG. 3.
Figure 3:
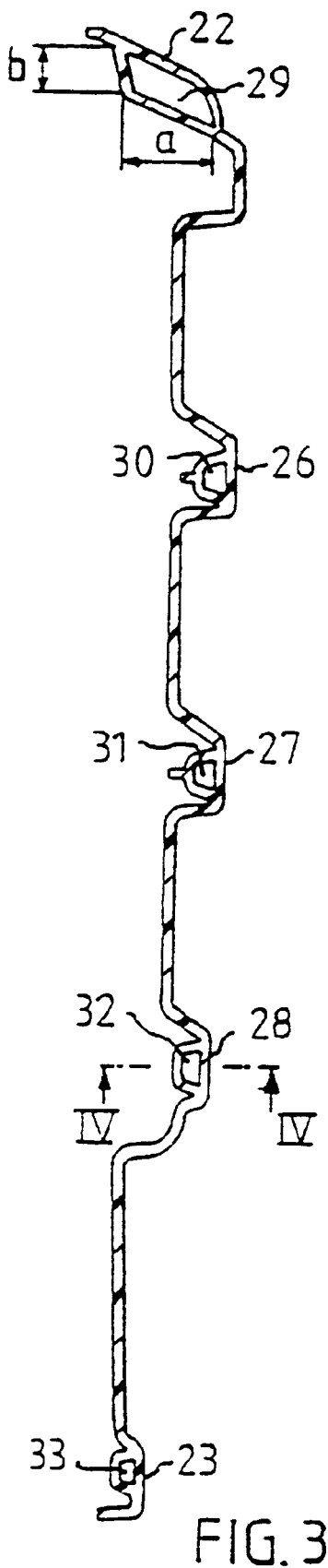
FIG. 3 shows a section along the line III—III in FIG. 2.

FIGS. 2, 3 and 4 illustrate a plastic article in the form of a radiator grill 20 for a motor vehicle, which can be manufactured with the method and gas injector moulding device described above.

The radiator grill shown comprises a rectangular frame, generally designated 21, which consists of a horizontal upper frame member 22, a horizontal lower frame member 23 and two vertical side frame members 24, which connect the upper and lower frame members 22 and 23 to each other. Between the frame members 22 and 23, a pair of vertical mouldings 25 extend and between these and each respective side frame member 24 a pair of horizontal mouldings 26 and 27 extend. Finally, a horizontal moulding 28 extends via the vertical mouldings 25 from one side frame member 24 to the other 24.

All of the components 22–28 shown and described are made in one piece with each other in a gas injection moulding process m the above described manner, so that cavities are formed in the frame members 22 and 23, respectively, and in the mouldings 26, 27 and 28, respectively. These cavities, which extend over the entire length of the frame members and the mouldings are designated 29, 30, 31, 32 and 33 in FIG. 3.

Element 40 in FIG. 2 designates the holes formed after the gas needles 15, through which gas under pressure is blown into the still not hardened plastic material during the gas injection moulding process. By using, as can be seen in FIG. 1, a mould cavity which has a gradually decreasing cross-sectional area towards the ends, a more balanced filling of the mould is assured than would be the case if the channels had had the same cross-sectional area along their entire length. Thus, if the plastic material on one side of the needle 15 should tend to flow out more rapidly towards the end of the mould cavity than the plastic material on the other side of the needle, the counter-pressure against the former plastic material would increase when it reaches the tapered portion of the mould cavity, so that the gas pressure increases against the latter plastic material which has still not reached the corresponding opposite tapered portion of the mould cavity, thus balancing the filling.

What is claimed is:

1. Method of manufacturing a plastic article with a cavity enclosed in the same, comprising the following steps:

injection of plastic material under pressure into a mould cavity, cooling the plastic material closest to the walls of the mould cavity, injection of gas under pressure into fluent plastic material, which is surrounded by the cooled plastic material, pressing out fluent plastic material to at least one spill chamber located outside the mould cavity and communicating with the mould cavity, by means of the injected gas to form a cavity in the plastic material, and separation of the plastic material in the spill chamber from the plastic material in the mould cavity, characterized in that a communication with a predetermined flowthrough area is maintained between the mould cavity and the spill chamber during the injection of the fluent plastic material, and that a communication with a larger predetermined flowthrough area is maintained between the mould cavity and the spill chamber during the injection of the gas.

2. Method according to claim 1 for manufacture of a plastic article with a cavity in the form of an elongated channel, characterized in that the gas is injected mid-way between the two ends of an elongated mould cavity with a cross-section decreasing towards its ends.

3. Injection moulding device with a mould cavity defined by movable walls, comprising means for injecting under pressure fluent plastic material into the mould cavity, means for injecting gas under pressure into the plastic material in the mould cavity, at least one spill chamber located outside the mould cavity and communicating with the mould cavity, said spill chamber being arranged to receive plastic material forced out by the injected gas, and means for opening and cutting off the communication with the spill chamber, characterized in that the means (12, 19) for opening and cutting off the communication (10, 11) with the spill chamber (9) and the means (7, 8, 18) for injecting the plastic material are controlled buy a control unit (16) so that the communication between the mould cavity (4) and the spill chamber (9) is controlled to be kept partially open at a non-closed position during injection of the plastic material and completely open during injection of the gas.

4. Injection moulding device according to claim 3, characterized in that the communication (10,11) between the mould cavity (4) and the spill chamber (9) contains a valve element (12) in the form of an ejector pin, which has a first position in which it keeps the communication completely closed, a second position in which it keeps the communication partially open, and a third position in which it keeps the communication completely open, and which is so arranged that it, as it moves from the open to the closed position, separates the plastic material (c) in the spill chamber (9) from the plastic material (b) in the mould cavity (4) and thereafter, during continued movement, ejects the plastic article out of the mould cavity after the mould cavity has been opened.

5. Injection moulding device according to claim 4, characterized in that the spill chamber (9) is arranged to be opened when the mould cavity (4) is opened, and that an additional ejector pin (13) is arranged in conjunction with the spill chamber to eject the plastic material in the spill chamber.

6. Injection moulding device according to claim 3, characterized in that the mould cavity (4) has a greater length than height and width and has end portions with cross-sectional areas decreasing towards the ends, and that the means (7, 8, 18) to inject fluent plastic material under pressure and means to inject gas under pressure are arranged to inject the plastic material and gas to the mould cavity midway between its two ends.

* * * * *